United States Patent
Brogårdh et al.

(10) Patent No.: US 7,084,595 B2
(45) Date of Patent: Aug. 1, 2006

(54) METHOD FOR THERMAL OPTIMIZATION

(75) Inventors: Torgny Brogårdh, Västerås (SE);
Magnus Ahlbäck, Västerås (SE);
Jesper Bergsjö, Västerås (SE); Staffan Elfving, Västerås (SE); Anders Lager, Västerås (SE); Stig Moberg, Västerås (SE); Mats Myhr, Västerås (SE); Dan Rylander, Västerås (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 10/472,223

(22) PCT Filed: Mar. 14, 2002

(86) PCT No.: PCT/SE02/00464

§ 371 (c)(1),
(2), (4) Date: Jan. 29, 2004

(87) PCT Pub. No.: WO02/074501

PCT Pub. Date: Sep. 26, 2002

(65) Prior Publication Data

US 2004/0124802 A1    Jul. 1, 2004

(30) Foreign Application Priority Data

Mar. 20, 2001  (SE) .................. 0100974

(51) Int. Cl.
*G05B 11/01* (2006.01)
(52) U.S. Cl. ............ 318/560; 318/574; 318/569; 700/253; 700/261
(58) Field of Classification Search ........... 318/560, 318/567, 565, 568.12, 568.18, 569, 574; 700/245, 253, 261
See application file for complete search history.

(56) References Cited

U.S. PATENT DOCUMENTS

| | | | | |
|---|---|---|---|---|
| 3,576,979 A | * | 5/1971 | McCall et al. | 318/569 |
| 3,890,552 A | * | 6/1975 | Devol et al. | 318/568.14 |
| 4,639,653 A | * | 1/1987 | Anderson et al. | 318/599 |
| 4,734,866 A | | 3/1988 | Bartelt et al. | |
| 5,347,445 A | | 9/1994 | Moosmann et al. | |
| 5,550,448 A | * | 8/1996 | Ferragina | 318/569 |
| 5,708,342 A | | 1/1998 | Nihei et al. | |
| 5,949,683 A | * | 9/1999 | Akami et al. | 700/123 |
| 5,963,003 A | | 10/1999 | Boyer | |
| 6,308,113 B1 | * | 10/2001 | Nowlin et al. | 700/245 |

FOREIGN PATENT DOCUMENTS

WO    97/29890    8/1997

* cited by examiner

*Primary Examiner*—Rina Duda

(74) *Attorney, Agent, or Firm*—Venable LLP; Eric J. Franklin

(57) ABSTRACT

Method for optimizing the movement performance of an industrial robot for a current movement path with respect to thermal load on the driving system of the robot, wherein the method comprises the following steps: for at least one component in the driving system, the thermal load is calculated for the whole or parts of the movement path if the calculated thermal load is compared with a maximally allowed load for the component; and dependent on said comparison, a course of accelerations and velocities for the current movement path are adjusted.

20 Claims, 2 Drawing Sheets

METHOD FOR THERMAL OPTIMIZATION

TECHNICAL FIELD AND PRIOR ART

The present invention relates to a method for optimising the movement performance of an industrial robot for a current movement path with respect to power losses in the driving system of the robot. The invention also relates to a computer program product which, when run by a processor, controls it so that the steps of the method are executed.

An industrial robot comprises a number of arms, which are rotatable relative to each other around a number of movement axes. The velocities and the accelerations of the axes are controlled by the control system of the robot, which gives control signals to the driving system of the robot. The driving system comprises one engine and one driving device per movement axis. When the robot is in operation, a heating of the engines and the driving devices takes place due to power losses arising from the electro-mechanical energy conversion. Maximally allowed heating is determined by the electronic circuits in the driving devices and the insulation material in the windings of the engine. The power gain from the engines of the robot is usually dependent on the maximally allowed heating of the driving system.

An industrial robot has a very wide range of applications. Different applications put demands on the thermal load in the driving system, i.e. how large the power losses may be in the driving system. For each application, the robot is programmed to follow a certain path of movement with given velocities and accelerations. How large the thermal load on the driving system will become, i.e. how large the heating of the driving devices and the engines will become, depends on the structure of the path of movement. A movement path, for which the driving system is heavily loaded during relatively short periods of time and for these periods with a small thermal load on the driving system. On the other hand, a movement path with long periods with medium load and no or a small number of short periods with a small load can give a higher thermal load on the driving system.

Today, a thermal dimensioning of the driving system of a robot is made starting from the worst conceivable movement path from the viewpoint of thermal load. This means that the full capacity of the robot is only taken advantage of in a small number of applications.

DESCRIPTION OF THE INVENTION

The object of the invention is to obtain a method for optimising the movement performance of a robot with respect to the power loss in the driving system of the robot.

Optimisation of the movement performance of a robot for a current movement path refers to an optimisation of the accelerations and velocities of the robot axes for the movement path. According to the method according to the invention, this optimisation takes place through adjustment of the accelerations and the velocities for the movement path until a maximal thermal utilisation of the driving system of the robot has been achieved. A maximal thermal utilisation refers to that the power loss in the driving system is as close to the maximally allowed power loss in the driving system as possible without exceeding it. Of course, there may be other limits except the thermal, for example electrical and mechanical limits, resulting in that it is not always possible to run the driving system close to its outermost thermal limit. In order to compare the thermal load on the driving system with the maximally allowed load, the power loss in the driving system is computed over the whole or parts of the path. An advantage with the method according to the invention is that the thermal load is set in dependence on a current load for the current movement path, and thus the full capacity of the robot can be used in each individual application.

According to one embodiment of the invention, the courses of accelerations and velocities are adjusted indirectly by adjustment of one or several of the parameters of the driving system upwards or downwards until a maximal thermal utilisation of the driving system of the robot has been obtained. With the parameters of the driving system is mainly intended engine torque, engine currents, engine number of revolutions, and driving device currents.

Another way to execute the adjustment of the driving system parameters, is to adjust them upwards or downwards by use of a constant or a position dependent factor over the movement path. Another way is to instead set initial values for maximally allowed driving system parameters, for example for maximum engine torque, maximum engine number of revolutions and/or maximum driving device currents, and if the power loss differs from the one maximally allowed, the initial values are adjusted. Thereafter, a new execution with the new, adjusted initial values is performed. In this embodiment, the values for the engine torque, the engine number of revolutions, and the driving device currents are kept for the mayor part of the movement path and only the peak values are adjusted.

In one embodiment of the invention, the initial values are adjusted downwards if the power loss exceeds a maximum load, and the initial values are adjusted upwards if the power loss is below the maximally allowed with a predetermined value. This means that the optimisation can take place from two directions depending on whether the initial values give a power loss above or below the maximally allowed.

In one preferred embodiment of the invention, the initial values are formed essentially by electrically maximally limited driving system parameters and the initial values are adjusted downwards if the power loss exceeds the maximally allowed. The values for the electrically maximally limited driving system parameters are in most cases higher than the thermally limited and are independent of how hard the robot is run. By choosing electrically limited initial values, it is sufficient to optimise in one direction, i.e. if the power loss exceeds the maximally allowed the initial values are adjusted downwards.

In one embodiment of the invention, the computation of the power loss comprises the step that the driving system parameters for the robot for the current movement path are determined by execution of the current movement path in the control system of the robot. The advantages of executing the movement path in the control system of the robot are that the computations become exact and that no model of the software of the control system is needed. The software can either be executed by the hardware in the real control system of the robot or can be executed in a virtual control system, which means that it is run on some other hardware outside the robot, for example on a PC. In order to decide the driving system parameters of the robot, it is also necessary to know the behaviour of the robot during the execution. For this purpose, either the real robot can be run or a model of the robot can be used which comprises thermal models of the driving system.

In one embodiment of the invention, the computation of the power loss comprises the step that the driving system parameters of the robot for the movement path are determined by simulating the current movement path starting from a model of kinematics, dynamics, and thermal properties of the robot. One advantage with using models for the control system and the robot is that the whole optimisation procedure can take place off-line in an external computer. Since the development of the robot program for the movement path takes place off-line, it is practical if the optimisation also can take place in the same computer, for example if some reprogramming would prove necessary.

The driving system of the robot comprises several components, for example engines, driving devices, rectifiers, transformer, and cables. According to the invention, the power loss is computed for at least one of these components and the optimisation is based upon how the thermal load on the component differs from a maximally allowed. In one preferred embodiment of the invention, the power losses are computed for the driving device and for the engine, wherein the power loss for the engine is calculated as the sum of the power losses depending on the torque of the engine and the losses depending on the number of revolutions of the engine. Since engines and driving devices are the components in the driving system that develop the largest power losses and thus is in the greatest danger of becoming over-heated, an optimisation with respect to these two components gives a sufficiently accurate result.

In one embodiment of the invention, the engine torque, the number of revolutions of the engine, and/or the currents of the driving devices, or their maximally allowed values, are adjusted for the whole path. The advantage with adjusting the values along the whole path is that it is simple to execute. If performances are as important in all parts of the movement path, this method is usually sufficient.

However, it is common that the performances in some parts of the path are more important than the performance in other parts of the path. In one embodiment of the invention, the engine torque and/or or the engine number of revolutions and/or the currents of the driving devices are adjusted with different amounts in different parts of the movement path. By optimising different parts of the path by themselves, one can obtain a higher performance in selected critical parts of the path at the expense of the performance in other less critical parts of the path.

In one embodiment of the invention, at least one of the driving system parameters in at least one part of the movement path is adjusted and the driving system parameters are kept in at least one part of the path. This embodiment is especially advantageous in applications demanding maximum performance during one or several short periods of the path and where the path comprises one or several longer periods with a low demand on performance.

In one embodiment of the invention, the program code controlling the movement path is provided with a marking that marks which parts of the path that are critical and which parts that are not critical, and during the optimisation of the maximum engine torque, the optimisation is in the first place carried out in the critical parts of the movement path. Such a marking telling in which parts of the path it is important to keep maximum performance can be introduced already during the optimisation of the path with respect to the manufacturing process the robot is to execute. This marking can either be made automatically by setting a flag from the process instruction in the robot program or manually by an operator pointing at where the performance is important in the path.

In one embodiment of the invention, a thermal model of said component in the driving system is used to determine whether the thermal load on the component exceeds or differs essentially from the maximally allowed load. With such a thermal model, both the maximally allowed power loss of the component and the temperature increase of the component for a certain power loss can be computed. This means that there are two methods to determine whether the thermal load on the component exceeds or differs essentially from the maximally allowed load.

One method involves computing the maximally allowed power loss for the components in dependence on said thermal model and that this is comparing it with the computed power loss in the component for the actual path. The advantage of comparing the power losses with each other is that it is sufficient to compute the maximally allowed power loss for the component once. Thus, one does not need the thermal model in the subsequent optimisation steps.

The second method to determine whether the thermal load exceeds or differs essentially from the maximally allowed load comprises the step that the temperature in the component is calculated in dependence of the calculated power loss for the component and said thermal model, and that the temperature is compared with the maximally allowed temperature for the component.

The method according to the invention is suitably implemented in the form of instructions in a computer program executed by a processor 12. The processor can either belong to the control system of the robot itself or to a computer separate from the robot.

DESCRIPTION OF THE DRAWINGS

The present invention is now to be closer explained with reference to different embodiments described as examples.

DESCRIPTION OF EMBODIMENTS

For a certain robot application, a suitable movement path is determined starting from a number of desires the path is to accomplish in order to suit the application. These desires are commonly presented in the form of positions, velocities, and accelerations in Cartesian coordinates. In order to control the robot, one must recalculate the movement path into angle coordinates. The course of velocities and accelerations of the movement path are thus described as angle velocities and angle accelerations for robot axes. The work of obtaining a movement path for an application leads to a robot program controlling how the robot is to move along the path. When the robot program is executed, control signals are sent to the driving system of the robot driving the axes of the robot. The driving system 15 comprises for instance an engine 16 and a driving device 14. The control signals to the driving system determine which engine torque, engine velocities, and driving device currents that are obtained for each axis.

Figure 1:
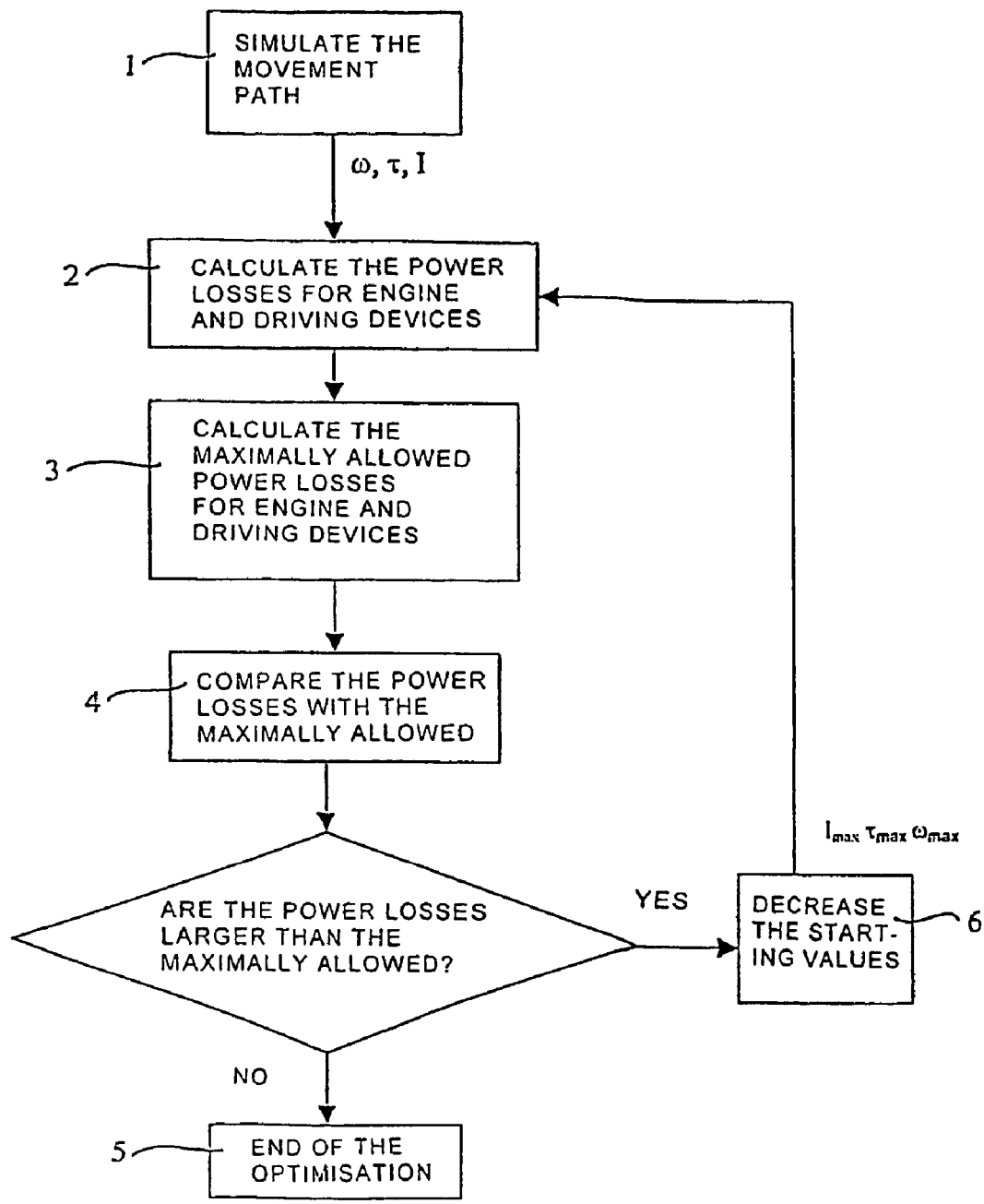
FIG. 1 shows a flow chart for one embodiment of a method for optimising the movement performance of a robot.
Figure 2:
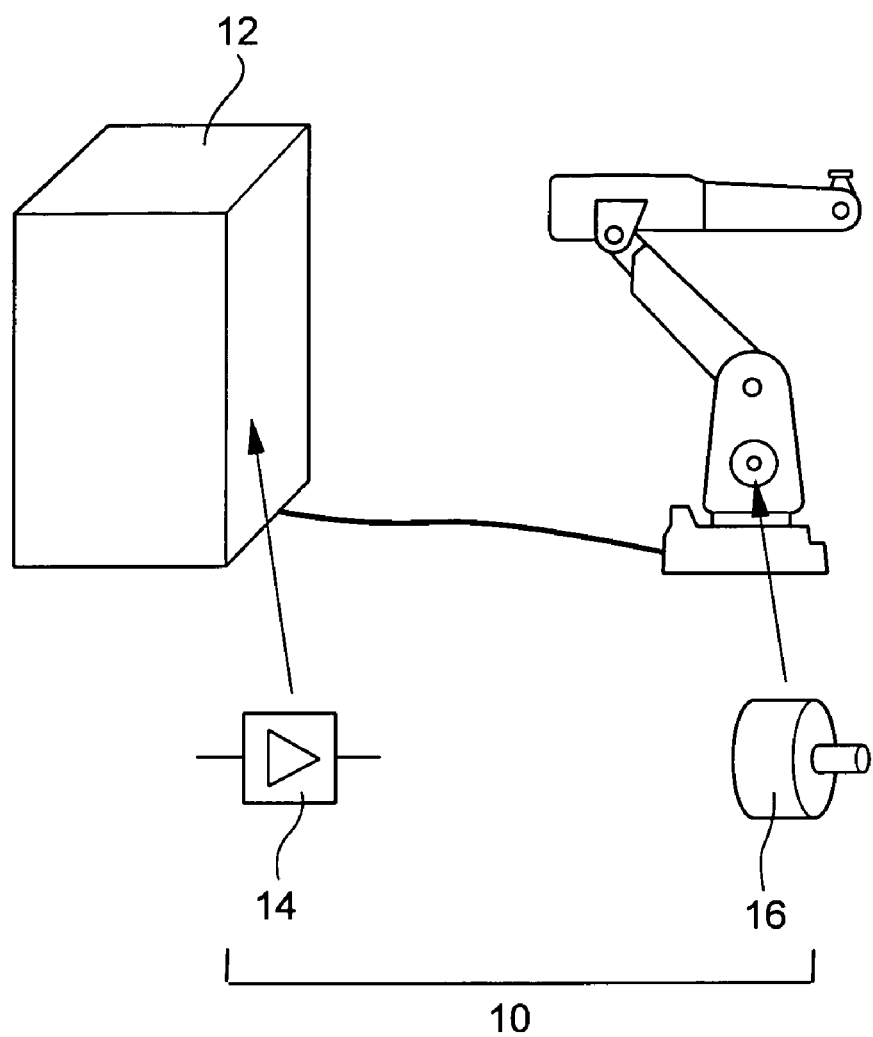
FIG. 2 shows an example of an industrial robot that the present invention may be utilized to control.

In FIG. 1, a flow chart for one embodiment of the invention is shown. In this embodiment, the path is optimised by producing optimum values for maximum driving device current, the maximum engine torque, and the maximum number of revolutions of the engine with respect to thermal limits. The starting values for maximum driving device current and maximum engine torque are given by the highest allowed values from an electrical viewpoint. In another embodiment, it is also conceivable that the starting values are formed by the maximum driving device current, the maximum engine torque, and the maximum number of revolutions of the engine for the most favourable movement path of the robot. The maximum engine torque that the driving system is able to generate is determined partly by the maximum torque that the engine can endure and partly by the maximum driving current that the driving device is capable to supply. The maximum engine torque for an axis (i) is thus given by the smallest value of the maximally allowed engine torque ($\tau_{imax}$) and maximally allowed driving device current ($I_{imax}$) multiplied by the torque constant ($k_{Ti}$) of the axis.

$$\tau_{i\ max} = \text{Min}\{\tau_{i\ max}, k_{Ti} \cdot I_{i\ max}\} \tag{1}$$

In a first step, block 1, the movement path is simulated with the starting values for maximum engine torque, which are determined according to equation (1) and with maximum allowed number of revolutions of the engine. The simulation is performed with a model of the movement control software of the control system. The simulation is carried out off-line in a computer separate from the control system of the robot. During the simulation, the current events ($I_i(t)$), torque events ($\tau_i(t)$), and velocity events ($\omega_i(t)$) for all axes that the driving system must generate in order to execute the movement path are obtained.

Knowing the course of the torque, current, and velocities for the path, the magnitude of the power losses developed in the engine and in the driving device can be calculated for the movement path, block 2. For each axis, the power loss is calculated in the driving device ($P_{Ii}$) as the square average of the current for the movement path, the torque dependent power loss of the engine ($P_{\tau i}$) is calculated as the square average of the torque of the movement path and the number of revolution dependent power loss of the engine ($P_{\omega i}$) is calculated as the square average of the number of revolutions for the movement path.

$$P_{Ii} = \frac{1}{t_c} \cdot k_{Ii} \cdot \int_0^{t_c} [I_i(t)]^2 dt \tag{2}$$

$$P_{\tau i} = \frac{1}{t_c} \cdot k_{\tau i} \cdot \int_0^{t_c} [\tau_i(t)]^2 dt \tag{3}$$

$$P_{\omega i} = \frac{1}{t_c} \cdot k_{\omega i} \cdot \int_0^{t_c} [\omega_i]^2 dt \tag{4}$$

$t_c$=the time for execution of the current path (=the cycle time)

$k_{Ii}$, $k_{\tau i}$, $k_{\omega i}$=proportionality constants

If the cycle time of the path is longer than the thermal time constants, the cycle time should be divided into part-cycles with a length decided by the thermal time constant. Thereby, the partial cycles can be optimised each on its own, which further increases the thermal exploitation of the driving system.

At a given temperature of the surrounding ($T_{omg}$), which is continuously measured or given as a configuration parameter, and at a given maximum temperature of the driving device and the engine, a maximum allowed temperature increase of the engine $\Delta T_{mimax}$ and the driving device $\Delta T_{dimax}$ can be calculated. The maximally allowed temperature increase is calculated as the difference between the maximally allowed temperature and the temperature of the surrounding. Knowing the maximally allowed temperature increase and with the help of a thermal model of the function of the engine $F_{mi}$ and the function of the driving device $F_{di}$ a maximum cooling efficiency for the engine $P_{mimax}$ and for the driving device $P_{dimax}$ can be determined, block 3. The thermal model assumes that the cooling capacity of engine and driving device, i.e. quantities such as heat emitting area, heat conduction constants, and heat transfer constants are known.

$$P_{di\ max} = F_{di}(\Delta T_{di\ max}) \tag{5}$$

$$P_{mi\ max} = F_{mi}(\Delta T_{mi\ max}) \tag{6}$$

In order for driving devices and engines not to become over-heated for the present path, the power loss in the driving device ($P_{di}$) must be less than or the same as the maximum cooling efficiency for the driving device ($P_{dimax}$) and the sum of the power loss of the engine dependent on the torque ($P_{\tau i}$) and the power loss of the engine dependent on the number of revolutions ($P_{\omega i}$) must be less than or the same as the maximum cooling efficiency for the engine ($P_{mimax}$).

$$P_{di} \leq P_{di\ max} \tag{7}$$

$$P_{\tau i} + P_{\omega i} \leq P_{mi\ max} \tag{8}$$

The calculated power losses for the engine and the driving device are compared with the maximally allowed power loss, block 4. If these power conditions are fulfilled, the optimisation is terminated with regard to the thermal load, block 5, else one has to continue with the next step in the optimisation. If the power conditions are not fulfilled, it is necessary to reduce the given starting values for maximum driving device current, maximum engine torque, and possibly also maximum number of revolutions, block 6. The simplest way to achieve this, is to lower the maximum values for the whole movement path, block 6. Then, the method described above is repeated with the new, reduced values for maximum driving device current, maximum engine torque, and maximum number of revolutions. The method is repeated until the power conditions, i.e. the equations 7 and 8, are fulfilled. The maximum values obtained in this way for the driving device current, engine torque, and number of revolutions are optimised from a thermal viewpoint and can then be used as a starting point for a further optimisation, for example with regard to mechanical limitations. The optimised maximum values are then used to calculate the optimal angle velocities and angle accelerations for the movement path in the path interpolator of the control system.

Often, there are parts of the path that are more important for the performance than other parts. For example, when the robot is to perform an operation on an object, it is more important with a higher performance during the operation itself than during the movement to and from the object. By marking already in the program code the parts of the path that demands a high performance, i.e. are critical for the process, and for those that do not have any higher demands on performance, i.e. are non-critical for the process, one can make a selective performance optimisation during the thermal optimisation. The power losses can now selectively be decreased in non-critical parts of the path and be maintained in the critical parts of the path.

If the power losses for the first simulation are larger than the maximally allowed, a new simulation and power calculation is carried out. For the second turn of the simulation, the power losses according to the equations 2–4 are separated into a critical and a non-critical part. The optimisation of the distribution of the performance is done by decreasing the maximum engine torque and possibly the maximum number of revolutions, in the non-critical parts of the path with a certain factor, after which a new simulation and a new power calculation is made. This method is repeated until the power conditions according to equations 7 and 8 are fulfilled. In order for the non-critical part of the path not to suffer from too large decreases in the performance, a limit on the decrease of the maximum engine torque must be introduced. If the decrease in the maximum engine torque for the non-critical parts has become too large, one can instead continue by also decreasing the maximum number of revolutions in the non-critical parts. In the same way as for the maximum engine torque, a limit on how large the decrease in the maximum engine torque may be must also be set.

If the power conditions according to equations 7 and 8 are still not fulfilled when the maximum number of revolutions and the engine torque for the non-critical parts of the path has been decreased, performance decreases must also be made for the critical parts of the path. In the same way as for the non-critical parts of the path, the maximum engine torque is decreased, and the simulation and power computation is repeated until the power conditions are fulfilled. If the power conditions are still not fulfilled when the maximum engine torque falls below a minimally allowed value, the maximum number or revolutions is decreased.

If the maximally allowed cooling efficiency for the engine ($P_{mimax}$) and the driving device ($P_{dimax}$) are not known, but nominal currents, torques and number of revolutions are available, the optimisation can be carried out in respect of these quantities instead. The nominal number of revolutions is calculated as the square mean value of the angle velocity for the movement path and the nominal engine torque can be obtained from the characteristics of the number of revolutions for the engines of interest. Alternatively, the nominal values for the path can be calculated from the intermittency of the driving device currents, engine torque, and number of revolutions of the engine. The optimisation is then aimed at seeing to it that the nominal engine torque is less than the maximally allowed engine torque and that the nominal current is less than the maximally allowed current. Nominal values of currents and torques are obtained during the simulation.

Instead of using the power conditions in the equations 7 and 8, one can instead use a temperature condition. Maximally allowed temperature for engines $T_{mmax}$ and driving devices $T_{dmax}$ is compared with calculated temperatures $T_m$, $T_d$, wherein the decrease of the maximum engine torque is carried out in dependence of this comparison. The temperature of the engines and the driving devices for the movement path are calculated from the powers calculated in equations 2–4, the temperature of the surrounding $T_{omg}$ and with the help of the previously mentioned thermal model. The new conditions that are now to be fulfilled are that the engine temperature and the temperature of the driving device are to be less than the maximally allowed temperatures:

$$T_m = f_{mi}(P_m, T_{omg}) < T_{mmax} \quad (9)$$

$$T_d = f_{di}(P_d, T_{omg}) < T_{dmax} \quad (10)$$

where $f_{mi}$ and $f_{di}$ are functions describing the thermal properties of the engine and the driving device, respectively.

The optimisation of maximum engine torque and number of revolutions is carried out in a corresponding way as described above until the calculated temperatures are less than the maximally allowed.

In order to expedite the optimisation by finding the optimum values for the driving system parameters as quickly as possible, it can be suitable to use a gradient-seeking method. In the following, a simple gradient-seeking method is described, in which the derivative of the maximum engine torque in respect of the power loss $$\frac{\partial \tau}{\partial P}$$

is used to calculate new starting values for the maximum engine torque $P_{mmax}$. In this embodiment, one wishes to decrease the temperature of the engine by decreasing the starting value on the maximum engine torque only. Before the derivative for the maximum engine torque in respect of the power loss can be calculated, at least two simulations (number n–1 and n) with different starting values on maximum $\tau_{mmax}^n$, $\tau_{mmax}^{n-1}$ engine torque must be carried out and the power losses must be calculated for both the simulations $P_m^{n-1}$, $P_m^n$. If the temperature of the engine is still larger than the maximally allowed in the second simulation, the derivative $$\frac{\partial \tau^n}{\partial P}$$

is calculated according to the equation 11 in dependence of the difference between the starting values for the maximum engine torque in both the previous simulations $\tau^{mmax^n} - \tau_{mmax}^{n-1}$ and the difference between the previous power losses from both the previous simulations $P_m^n - P_m^{n-1}$. Thereafter, a new starting value on the maximum engine torque $\tau_{mmax}^{n+1}$ is calculated according to equation 12 starting from the maximum engine torque in the previous simulations $\tau_{mmax}^{n-1}$, $\tau_{mmax}^n$, the calculated derivative $$\frac{\partial \tau^n}{\partial P}$$

and the difference between the maximally allowed power loss $P_{mmax}$ and the calculated power loss $P_m^n$ in the previous simulation:

$$\frac{\partial \tau^n}{\partial P} = \frac{\tau_{mmax}^n - \tau_{mmax}^{n-1}}{P_m^n - P_m^{n-1}} \quad (11)$$

$$\tau_{mmax}^{n+1} = \tau_{mmax}^n + \frac{\partial \tau^n}{\partial P} \cdot (P_{mmax} - P_m^n) \quad (12)$$

The iteration is repeated until the difference between the maximum allowed power loss $P_{mmax}$ and the calculated power loss $P_m^{n+k}$ is less than a predetermined lowest value $\epsilon$.

$$|P_{mmax} - P_m^{n+k}| < \epsilon \quad (13)$$

Generally, n=2 and k≦5, where n is the number of simulations for calculating the seeking gradient and k the number of simulations during the iteration.

If the temperatures in the driving device and in the engine are instead less than the maximally allowed temperature, the engine torque is increased in a corresponding iterative way until condition 13 is fulfilled. The sign of the derivative in equation 11 decides whether the maximum engine torque is to be increased or decreased. Using this method, an arbitrary value can be set as a starting value on the maximum engine torque and the value is later adjusted upwards or downwards until an optimal value has been found. With an optimal value is intended a value on the maximal engine torque, where the temperature of the components in the driving system is less than the maximally allowed temperature but that the temperature is as close to the maximally allowed as possible. How close to the maximally allowed temperature one can direct the optimisation depends on the accuracy of the thermal driving system models. A suitable value is 5° C.

If it is an electrical limitation and not a thermal limitation of the engine torque and the driving device currents that gives the limitation of the performance, one can still obtain an improved robot performance by increasing the maximum number of revolutions. In this case, the maximum engine torque and maximum driving device current given by the electrical limitations, and the movement path are simulated with these values. In the same way as previously, the power loss is calculated and compared with a maximally allowed power loss. If the power loss is less than the maximally allowed from a thermal viewpoint, the maximum number of revolutions can be increased so that the power loss is increased without resigning the electrical limitation, which, in turn, can give a shorter cycle time.

It should be pointed out that, except from optimisation of the engine torque, the engine number of revolutions, and driving device currents along a programmed path, optimisation with the described method can also be carried out for the rectifying current and the transformer current at given levels of voltage. It is especially interesting to optimise the thermal usage of the rectifier. By calculating the power loss for the rectifier and optimising the movements of the robot so that the rectifier works as close to the maximally allowed power as possible, it can be cost optimised in a better way.

It should also be pointed out that, instead of controlling the engine torque, the engine velocities, and/or the driving device currents of the driving system model iteratively, the direct path acceleration and path velocities can be adjusted until an optimally thermal usage of the driving system is obtained.

The invention claimed is:

1. A method for thermal optimization of the movement performance of an industrial robot for a current movement path with respect to power losses in a driving system of the robot, the method comprising:
   for at least one component in the driving system, the power loss is calculated for the whole or parts of the movement path,
   the calculated power loss is compared with a maximally allowed power loss for the component, and
   dependent on said comparison, a course of accelerations and velocities for the current movement path are adjusted.

2. The method according to claim 1, wherein the courses of the accelerations and the velocities are adjusted by adjusting one or several parameters of the driving system.

3. The method according to claim 2, wherein starting values are set for said driving system parameters and the starting values are adjusted if the power loss differs from the maximally allowed, after which the method is repeated with the new, adjusted starting values.

4. The method according to claim 3, wherein the starting values are adjusted downwards if the power loss exceeds the maximally allowed, and the starting values are adjusted upwards if the power loss is below the maximally allowed with a predetermined value.

5. The method according to claim 3, wherein said starting values essentially are constituted by electrically limited maximum driving system parameters and the starting values are adjusted downwards if the thermal load exceeds the maximally allowed.

6. The method according to claim 1, wherein the driving system parameters of the robot are determined for the movement path and the power losses are calculated in dependence of the determined driving system parameters.

7. The method according to claim 6, wherein the driving system parameters for the movement path are determined by execution of the current movement path with use of the software of the control system of the robot.

8. The method according to claim 6, wherein the driving system parameters for the movement path are determined by simulation of the current movement path based on a model of the robot and its control system.

9. The method according to claim 2, wherein said driving system parameters comprise engine torque, engine number of revolutions, and driving device currents for the movement path.

10. The method according to claim 1, wherein the driving system comprises a driving device and an engine, and wherein the power losses are calculated for the driving device and for the engine, wherein the power loss for the engine is calculated as the sum of the power losses dependent of the engine torque and the losses dependent on the number of revolutions of the engine.

11. The method according to claim 10, wherein the power losses in the driving device are calculated in dependence on the square mean value of the current for the whole or parts of the movement path, the torque dependent power loss of the engine is calculated as the square mean value of the torque for the whole or parts of the movement path and the power loss of the engine dependent on the number of revolutions is calculated as the square mean value of the number of revolutions for the whole or parts of the movement path.

12. The method according to claim 2, wherein one or several of the driving system parameters are adjusted for the whole path.

13. The method according to claim 2, wherein one or several of the driving system parameters are adjusted differently in different parts of the movement path.

14. The method according to claim 2, wherein at least one of the driving system parameters is adjusted in at least any part of the movement path, and the driving system parameters are kept in at least any part of the path.

15. The method according to claim 13, wherein programming code controlling the movement path is provided with a marking that indicates which parts of the path are critical and which are non-critical and wherein, during the optimization of the control system parameters, the optimization is primarily carried out for the critical parts of the movement path.

16. The method according to claim 1, wherein a thermal model of said component is used to determine whether a temperature of the component exceeds or differs essentially from the maximally allowed temperature of the component.

17. The method according to claim 16, wherein a maximally allowed power loss for the component is calculated in dependence on said thermal model, wherein the power loss is compared with the maximally allowed power loss.

18. The method according to claim 16, wherein the temperature in the component is calculated in dependence on the calculated power loss for the component and said thermal model, wherein the temperature is compared with a maximally allowed temperature for the component.

19. The method according to claim 2, wherein a gradient seeking method is used to find optimum values on the driving system parameters.

20. A computer program product comprising:
   a computer readable medium; and
   sequential instructions for a processor and that can be directly downloaded into an internal memory in connection to the processor, comprising software code portions included on the computer readable medium for performing when run by the processor a method comprising:
   calculating a power loss for at least one component in a driving system of an industrial robot for whole or parts of a movement path,
   comparing the calculated power loss with a maximally allowed power loss for the at least one component, and
   adjusting a course of accelerations and velocities for the current movement path dependent on the comparison.

* * * * *